(12) United States Patent
Niespodziany et al.

(10) Patent No.: US 6,532,637 B1
(45) Date of Patent: Mar. 18, 2003

(54) METHOD OF CONVERTING AN AIRCRAFT BRAKE ASSEMBLY AND A CONVERTIBLE AIRCRAFT BRAKE ASSEMBLY

(75) Inventors: David A. Niespodziany, South Bend; Sean W. Linden, Granger, both of IN (US); David D. McAfee, Niles, MI (US)

(73) Assignee: Honeywell International Inc., Morristown, NJ (US)

( * ) Notice: Subject to any disclaimer, the term of this patent is extended or adjusted under 35 U.S.C. 154(b) by 198 days.

(21) Appl. No.: 09/644,718

(22) Filed: Aug. 23, 2000

Related U.S. Application Data

(63) Continuation-in-part of application No. 09/335,243, filed on Jun. 17, 1999, now Pat. No. 6,119,817, which is a continuation-in-part of application No. 08/870,923, filed on Jun. 6, 1997, now Pat. No. 5,926,932.

(51) Int. Cl.⁷ .................. B23K 21/16; B23P 17/04; F16D 55/36; F16D 55/02
(52) U.S. Cl. .................. 29/401.1; 188/71.5; 188/71.6
(58) Field of Search .................. 29/401.1; 188/71.5, 188/71.6, 73.35, 72.5

(56) References Cited

U.S. PATENT DOCUMENTS

| | | | |
|---|---|---|---|
| 3,887,041 A | 6/1975 | Malone | 188/71.5 |
| 4,587,888 A | 5/1986 | Chambers | 95/13.6 |
| 4,742,895 A | 5/1988 | Bok | 188/71.7 |
| 5,107,968 A | 4/1992 | Delpassand | 188/264 |
| 5,205,382 A | 4/1993 | Edmisten | 188/71.5 |
| 5,255,761 A | 10/1993 | Zaremsky | 188/71.5 |
| 5,321,876 A | 6/1994 | Massing et al. | 29/401.1 |
| 5,485,898 A | 1/1996 | Patko | 188/71.5 |
| 5,540,305 A | 7/1996 | Hammond | 188/71.5 |

FOREIGN PATENT DOCUMENTS

| | | | |
|---|---|---|---|
| EP | 0716244 | 6/1996 | F16D/55/40 |
| EP | 0840 029 A1 | 6/1998 | F16D/55/36 |
| WO | 98/55777 | 10/1998 | F16D/55/36 |

*Primary Examiner*—David P. Bryant
*Assistant Examiner*—John C. Hong
(74) *Attorney, Agent, or Firm*—Larry J. Palguta

(57) ABSTRACT

A convertible aircraft brake assembly (10) designed as original equipment to have heat sinks comprising a steel heat sink (20) aircraft brake assembly and a carbon-carbon composite heat sink (40) aircraft brake assembly. When the aircraft brake assembly is converted from one type of heat sink to the other, the conversion is accomplished with minimal changes in component parts. The conversion can be accomplished with a change in the piston bushing assemblies (18, 21) of the piston housing (14), while the torque tube (12), wheel (30), piston housing (14) and other parts can be utilized with the heat sinks (20, 40).

28 Claims, 1 Drawing Sheet

Figure 1:
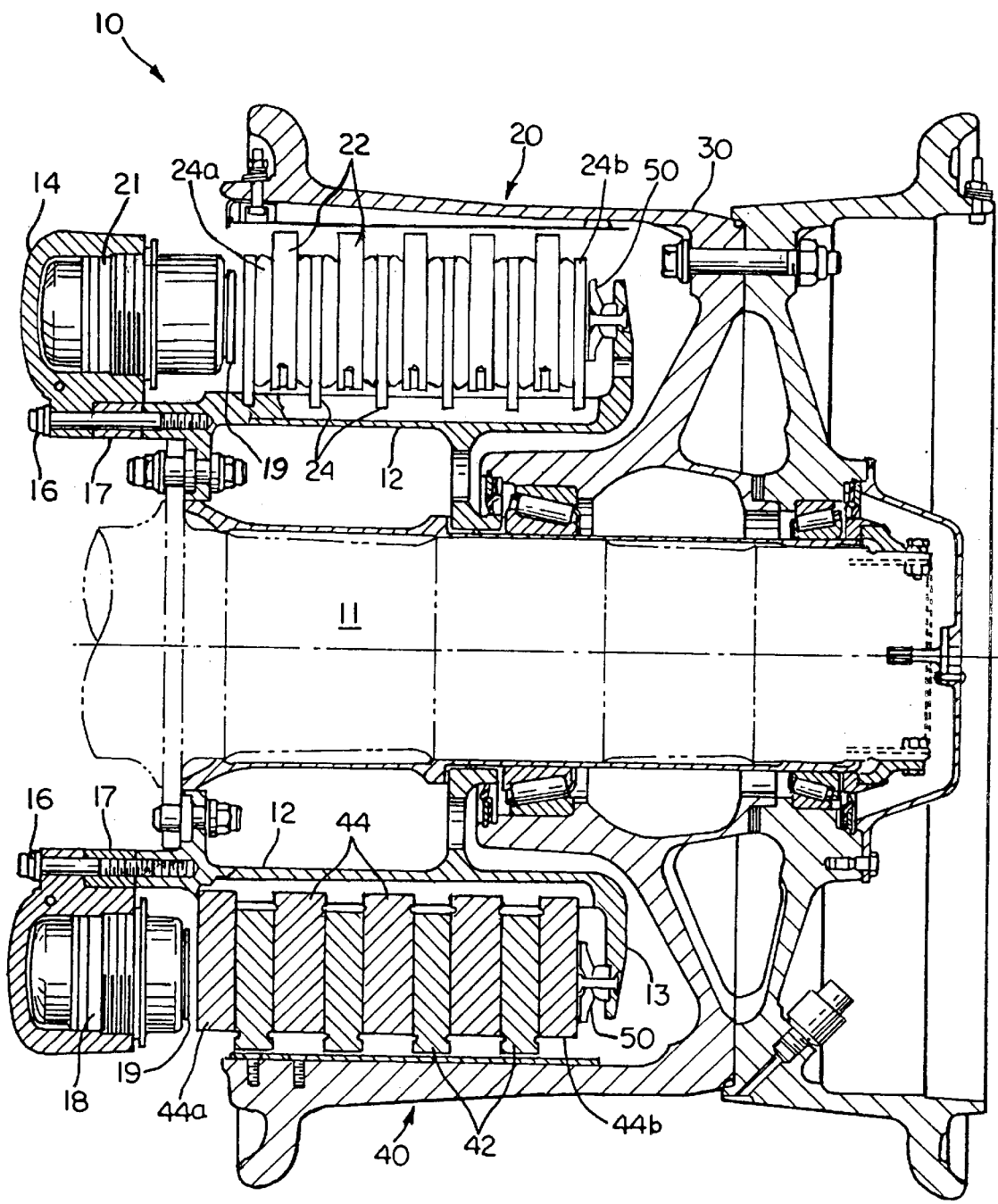

METHOD OF CONVERTING AN AIRCRAFT BRAKE ASSEMBLY AND A CONVERTIBLE AIRCRAFT BRAKE ASSEMBLY

This is a continuation-in-part of U.S. patent application Ser. No. 09/335,243 filed Jun. 17, 1999 now U.S. Pat. No. 6,119,817 which is a continuation-in-part of U.S. pat. application Ser. No. 08/870,923 filed Jun. 6, 1997 now U.S. Pat. No. 5,926,932.

The present invention relates generally to aircraft brakes, and in particular to aircraft brake assemblies that are convertible from a first type of heat sink to a second type of heat sink.

Steel heat sink aircraft brake assemblies have proven to be economical, reliable, and desirable for aircraft that fly relatively short distances. Steel heat sink aircraft brake assemblies are still state of the art in the aerospace industry. Such brake assemblies typically include either steel rotor or stator disks and a corresponding plurality of friction material rotor or stator disks. Carbon-carbon composite heat sink aircraft brake assemblies are increasing in their usage as the size of commercial aircraft and their flying distance has increased. As disclosed in co-owned Massing et al. U.S. Pat. No. 5,321,876, commercial aircraft flying long distances or long hauls may increase revenue and/or reduce operating costs by utilizing the significant weight benefits offered by a carbon-carbon composite heat sink as compared to a generally heavier steel heat sink. However, if an aircraft with carbon-carbon composite heat sinks is scheduled to fly a short haul, the use of such heat sinks may not be cost effective. Massing et al. U.S. Pat. No. 5,321,876 discloses a method of converting aircraft brake assemblies from a first heat sink to a second heat sink, wherein different piston bushing assemblies, backing plate connectors and heat shields are utilized for the respective heat sinks. It is highly desirable that an aircraft brake assembly suitable for utilization of either a carbon-carbon composite heat sink or a steel heat sink can be easily converted from one heat sink to the other. It is an object of the present invention to simplify the method of converting aircraft brake assemblies, and thus avoid the distinct disadvantages of converting or retrofitting an existing brake assembly from a carbon-carbon composite heat sink to a steel heat sink which could result in a heavier steel aircraft brake assembly than a brake assembly designed originally to be only a steel aircraft brake assembly. With the present invention, an airline would be able to utilize a method for converting the aircraft brake assembly and thus can order a group or fleet of aircraft suitable for long and short hauls, with the long haul aircraft utilizing a carbon-carbon composite heat sink brake assembly while the short haul aircraft utilize a steel heat sink aircraft brake assembly. Other reasons for converting may include airline maintenance cost and capabilities, fluctuating fuel costs or flight weight limitations. Also, should changes in aircraft scheduling occur, the particular type of heat sink utilized in the brake assemblies can be converted easily to a different type of heat sink. It is highly desirable that a convertible brake assembly contain common parts in order to the reduce the number of parts and inventory, and that corrosion resistance of parts be improved to effect the enhanced reliability and useful life of the parts. Also highly desirable is that vibrations in the brake assemblies be minimized to reduce the possibility of damage to parts of the assemblies, and that appropriate thermal barriers be present to prevent or reduce heat transfer. Finally, it is highly desirable that the convertible brake assembly of the present invention have the capability of being changed to a different convertible brake assembly, such as one or more of the convertible brake assemblies disclosed in copending U.S. patent application Nos. 09/322,255 and 09/335,243 and U.S. Pat. No. 5,926, 932, in order to offer the aircraft operator the advantages described above for carbon-carbon and steel aircraft brake assemblies. The present invention provides solutions to the above problems by providing an aircraft brake assembly designed as original equipment to be convertible from a first heat sink of one of carbon and steel brake assemblies to a second heat sink of the other of carbon and steel brake assemblies, the aircraft brake assembly for connection with a surrounding wheel via rotor disks of the respective heat sink, each heat sink including a pressure plate disk, rotor disks, stator disks, and a backing plate disk, the brake assembly comprising the first heat sink, a torque tube connected with the stator disks of the first heat sink and including a backing plate with pad means for engaging the backing plate disk, a piston housing connected by means for connecting with the torque tube, and a spacer member, the piston housing having a plurality of piston bushing assemblies with pistons located a distance from the pressure plate disk, the first heat sink having an overall axial length substantially filling an axial space between the pistons and pad means, comprising the steps of:

disassembling the piston housing, piston bushing assemblies, torque tube, connecting means, spacer member, and first heat sink, and assembling the second heat sink, torque tube, piston housing with piston bushing assemblies, connecting means, and spacer member, the piston housing having longer piston bushing assemblies, wherein the second heat sink has a shorter axial length than the first heat sink and the longer piston bushing assemblies position the pistons at substantially said distance from the pressure plate disk of the second heat sink.

The invention is described in detail below with references to the drawing which illustrates embodiment in which:

FIG. 1 an illustration of an aircraft brake assembly convertible by means of piston bushing assemblies of the steel heat sink having an increased axial length (shown in exaggerated form) compared to the axial length of typical piston bushing assemblies for a steel heat sink, and a steel heat sink having an axial length shorter compared to the axial length of a typical steel heat sink.

FIG. 1 illustrates an aircraft brake assembly with different first and second heat sinks shown in the top and bottom portions of the drawing only for illustrative purposes. In the upper portion of the drawing of the preferred embodiment of a convertible brake assembly, the aircraft brake assembly 10 includes a torque tube 12 attached to a piston housing 14 by a plurality of bolts 16. The piston housing 14 is attached to the torque tube 12 by means of the bolts 16 which comprise connection means and an intermediate annular spacer member, intermediate member, or ring 17. Piston housing 14 includes a plurality of piston bushing assemblies 21 with pistons 19. Piston bushing assemblies 21 have a longer axial length compared to typical piston bushing assemblies utilized for the carbon heat sink aircraft brake illustrated in the lower half of FIG. 1. An assembly 21 is longer by about 12.6 mm thereby enabling a longer piston extension or "throw" of about 9.4 mm relative to housing 14. It should be clearly understood that as part of the length of a piston bushing assembly 21 the piston 19 may be either the same length or a different length (typically longer) than a piston 19 in a piston bushing assembly 18 of the carbon heat sink aircraft brake illustrated in FIG. 1. The steel heat sink designated generally by reference numeral 20 includes a plurality of steel rotor disks 22 that engage, via spline and slot engagements, the surrounding wheel 30, as is well known in the art, and a plurality of friction material disks 24 engaging the torque tube 12 via the well known spline and slot engagement. It should be clearly understood that the rotors and stators can, as is well known in the art, be reversed such that the rotors which are keyed to the wheel have friction material thereon, while the stators which are keyed to the torque tube are essentially steel plates for engagement with the friction material of the rotors. Thus, each steel brake embodiment disclosed herein can comprise either one of these well-known constructions (eg. friction material linings on either the stators or rotors).

Steel heat sink 20 has a decreased axial width or length compared to the carbon-carbon composite heat sink designated by reference numeral 40 in the lower part of FIG. 1, and piston bushing assembly 21 has an increased axial length compared to piston bushing assembly 18 in the lower part of the drawing. Also, steel heat sink 20 has a decreased overall axial length accompanied to a typical steel heat sink, by means of less thick stators 24. Thus, by increasing the axial length of piston bushing assemblies 21 and decreasing the overall axial length of steel heat sink 20, the pressure plate disk 24a, which is interchangeable with the backing plate disk 24b, is positioned at a predetermined separation distance from the plurality of pistons 19.

In order to convert the brake assembly 10 from one having the steel heat sink 20 to a carbon-carbon composite heat sink designated by reference numeral 40 in the lower part of the drawing, the brake assembly 10 is disassembled wherein the piston housing 14, piston bushing assemblies 21, bolts 16, ring 17, torque tube 12 and heat sink 20, once removed from the axle 11, are disconnected from one another. The carbon-carbon composite heat sink 40, which comprises a plurality of rotor disks 42 and stator disks 44, is assembled on the torque tube as shown in the lower portion of the drawing, such that the backing plate stator disk 44b contacts the pad 50. The pad 50 is a typical swivel pad utilized with carbon-carbon composite disks, but which in brake 10 is also utilized to engage the backing plate disk 24b of steel heat sink 20. As can be readily seen in FIG. 1, the spacer member 17 positions the piston housing 14 at a distance further away from the backing plate 13 of the torque tube 12, thus accommodating both the carbon-carbon composite heat sink 40 and the longer length bushing assemblies 21 of the steel brake 20. In some brake assemblies, backing plate 13 is bolted onto torque tube 12 instead of being integral with the torque tube. Such a construction is within the scope of the present invention. Thus, brake assembly 10 is converted from a steel heat sink 20 to a carbon-carbon composite heat sink 40 by disassembling the steel heat sink convertible brake assembly, removing piston bushing assemblies 21 and steel heat sink 20 and replacing them with shorter piston bushing assemblies 18 and the carbon heat sink 40, and assembling the carbon heat sink convertible brake assembly. The spacer member or ring 17 is utilized in both of the steel and carbon heat sink brake assemblies and effects several improvements in the convertible brake assembly 10. Ring 17 is made of 4340 carbon steel and is diffused nickel cadmium plated. The benefit of such a ring is that the ring provides a corrosion resistant barrier between the aluminum piston housing 14 and the inherently corrosive steel torque tube. Typically, the torque tube has a heat resistant paint which eventually wears off or is stripped off during overhaul. Also, this will combat gauling of the piston housing interface surface (which normally engages the torque tube interface surface) that could occur, in the absence of a ring, after the torque tube 12 starts to rust during use of the aircraft. The ring 17 provides additional dampening which reduces brake vibrations transmitted into the piston housing. The piston bushing assemblies 18 and 21 contain many precision parts which need to be protected from damage by brake vibrations. Ring 17 provides thermal protection benefits. Heat transfer from torque tube 12 to piston housing 14 is reduced by ring 17, thus reducing hydraulic fluid temperatures. Some aircraft brake assembly specifications have very stringent maximum hydraulic temperature requirements. The present convertible brake assembly 10 can be considered a cool (low temperature) operating brake in comparison to other non-convertible brake assemblies. Finally, the convertible brake assembly provides the flexibility of being able to reduce the heat sink envelope by simply removing the ring and upon reassembly of the brake inserting a reduced axial length and lighter heat sink, while maintaining usable rejected take-off piston stroke for the shorter axial length heat sink. The shorter axial length heat sink may be either the steel heat sink or the carbon heat sink, or both. Of course, the ring 17 may also be used with the carbon heat sink and removed for the insertion of a shorter length steel heat as disclosed in U.S. Pat. No. 5,926,932.

Different length piston bushing assemblies 21 and 18 are used with the respective heat sinks 20 and 40. Because piston bushing assemblies 21 have a longer effective extension distance or "throw", they provide the steel brake 20 with an additional safety margin for rejected take-offs ("RTOs"), and also provide an additional safety margin when the wear pin (not shown) is fully used and the steel heat sink ready for overhaul. The brake assembly utilizes the pad backing plate means 50 with both heat sinks, rather than utilizing a friction material disk attached directly to the backing plate 13 of torque tube 12 as is typical in a steel heat sink brake (friction material backing plate disks are typically riveted to the backing plate 13 in steel heat sinks). Thus, the pad means is used with both heat sinks, and the pressure plate/backing plate disks 24a/24b and 44a/44b are interchangeable within their respective heat sinks. To convert the brake from one with carbon-carbon composite heat sink 40 to steel heat sink 20, the above steps are simply reversed.

The convertible brake assembly described above and illustrated in the drawings provide a more simply convertible brake which requires minimal changes in component parts. The brake assemblies all utilize, with either a steel heat sink or carbon heat sink, a common swivel pad means 50 which engages adjacent disks, spacers, or plates of both types of heat sinks. Additionally, the correspondingly shaped recesses typically utilized in carbon-carbon composite backing plate disks to receive the pad means are not utilized; the surface of the carbon-carbon composite backing plate disk does not have any recesses and the essentially flat surface engages the plurality of pad means 50. The brake assembly disclosed and illustrated herein has interchangeable pressure plate disks and backing plate disks within the respective heat sinks. This is a substantial advantage in that the number of different part numbers for the brake are reduced, and one part number can be used commonly at two positions within the respective heat sink of a brake assembly. The convertible brake assembly permits an airline to purchase an aircraft which can be utilized for different lengths of flights, with long haul designated aircraft utilizing carbon-carbon composite heat sink brake assemblies which may be more economical for such flights, while the short haul designated aircraft can use steel heat sink aircraft brake assemblies which are economical for short hauls. Other reasons for converting may include airline maintenance cost and capabilities, fluctuating fuel costs, or flight weight limitations. Should flight scheduling change or the airline decide to change some aircraft from one designated group to another designated group, the particular type of heat sink can be converted easily to the other type of heat sink and enable the airline to optimize operating costs.

What is claimed is:

1. A method of converting an aircraft brake assembly designed as original equipment to be convertible from a first heat sink of one of carbon and steel brake assemblies to a second heat sink of another of the carbon and steel brake assemblies, the aircraft brake assembly for connection with a surrounding wheel via rotor disks of the respective heat sink, each heat sink including a pressure plate disk, rotor disks, stator disks, and a backing plate disk, the brake assembly comprising the first heat sink, a torque tube connected with the stator disks of the first heat sink and including a backing plate with pad means for engaging the backing plate disk, a piston housing connected by means for connecting with the torque tube, and a spacer member, the piston housing having a plurality of piston bushing assemblies with pistons located a distance from the pressure plate disk, the first heat sink having an overall axial length substantially filling an axial space between the pistons and pad means, comprising the steps of:

disassembling the piston housing, piston bushing assemblies, torque tube, connecting means, spacer member, and first heat sink, and assembling the second heat sink, torque tube, piston housing with piston bushing assemblies, connecting means, and spacer member, the piston housing having longer piston bushing assemblies, wherein the second heat sink comprises a steel heat sink and includes friction material on one of the rotor disks and stator disks thereof with the friction material having axial thicknesses such that the second heat sink has a shorter overall axial length than the first heat sink and the longer piston bushing assemblies position the pistons at substantially said distance from the pressure plate disk of the second heat sink.

2. The method in accordance with claim 1, wherein the pad means is utilized with both of the first and second heat sinks.

3. The method in accordance with claim 1, wherein the pressure plate disk and backing plate disk are interchangeable within the respective brake assembly.

4. An aircraft brake assembly designed as original equipment to be convertible from a first heat sink of one of carbon and steel brake assemblies to a second heat sink of another of the carbon and steel brake assemblies, the aircraft brake assembly for connection with a surrounding wheel via rotor disks of the respective heat sink, each heat sink including a pressure plate disk, rotor disks, stator disks, and a backing plate disk, the brake assembly comprising the first heat sink, a torque tube connected with the stator disks of the first heat sink and including a backing plate with pad means for engaging the backing plate disk, a piston housing connected by means for connecting with the torque tube, and a spacer member, the piston housing having a plurality of piston bushing assemblies with pistons located a distance from the pressure plate disk, the first heat sink having an overall axial length substantially filling an axial space between the pistons and pad means, the brake assembly enabling:

disassembly of the piston housing, piston bushing assemblies, torque tube, connecting means, spacer member, and first heat sink, and assembly of the second heat sink, torque tube, piston housing with piston bushing assemblies, connecting means, and spacer member, the piston housing having longer piston bushing assemblies, wherein the second heat sink comprises a steel heat sink and includes friction material on one of the rotor disks and stator disks thereof with the friction material having axial thicknesses such that the second heat sink has a shorter overall axial length than the first heat sink and the longer piston bushing assemblies position the pistons at substantially said distance from the pressure plate disk of the second heat sink.

5. The aircraft brake assembly in accordance with claim 4, wherein the pad means is utilized with both of the first and second heat sinks.

6. The aircraft brake assembly in accordance with claim 4, wherein the pressure plate disk and backing plate disk are interchangeable within the respective brake assembly.

7. A method of converting an aircraft brake assembly designed as original equipment to be convertible from a first heat sink of one of carbon and steel brake assemblies to a second heat sink of another of the carbon and steel brake assemblies, the aircraft brake assembly for connection with a surrounding wheel via rotor disks of the respective heat sink, each heat sink including a pressure plate disk, rotor disks, stator disks, and a backing plate disk, the brake assembly comprising the first heat sink, a torque tube connected with the stator disks of the first heat sink and including a backing plate with pad means for engaging the backing plate disk, a piston housing connected by means for connecting with the torque tube, and a spacer member, the piston housing having a plurality of piston bushing assemblies with pistons located a distance from the pressure plate disk, the first heat sink comprising a steel heat sink having friction material on one of the rotor disks and stator disks thereof, and the first heat sink having an overall axial length less than an axial length of the second heat sink, comprising the steps of:

disassembling the piston housing, piston bushing assemblies, torque tube, connecting means, spacer member, and first heat sink, and assembling the second heat sink, torque tube, piston housing with piston bushing assemblies, connecting means, and spacer member, the piston housing having shorter piston bushing assemblies, wherein the second heat sink comprises a carbon heat sink having an axial length substantially filling an axial space between the pistons and pad means and the shorter piston bushing assemblies positioning the pistons at substantially said distance from the pressure plate disk of the second heat sink.

8. The method in accordance with claim 7, wherein the pad means is utilized with both of the first and second heat sinks.

9. The method in accordance with claim 7, wherein the pressure plate disk and backing plate disk are interchangeable within the respective brake assembly.

10. An aircraft brake assembly designed as original equipment to be convertible from a first heat sink of one of carbon and steel brake assemblies to a second heat sink of another of the carbon and steel brake assemblies, the aircraft brake assembly for connection with a surrounding wheel via rotor disks of the respective heat sink, each heat sink including a pressure plate disk, rotor disks, stator disks, and a backing plate disk, the brake assembly comprising the first heat sink, a torque tube connected with the stator disks of the first heat sink and including a backing plate with pad means for engaging the backing plate disk, a piston housing connected by means for connecting with the torque tube, and a spacer member, the piston housing having a plurality of piston bushing assemblies with pistons located a distance from the pressure plate disk, the first heat sink comprising a steel heat sink having friction material on one of the rotor disks and stator disks thereof, and the first heat sink having an overall axial length less than an axial length of the second heat sink, the brake assembly enabling:

disassembly of the piston housing, piston bushing assemblies, torque tube, connecting means, spacer member, and first heat sink, and assembly of the second heat sink, torque tube, piston housing with piston bushing assemblies, connecting means, and spacer member, the piston housing having shorter piston bushing assemblies, wherein the second heat sink comprises a carbon heat sink having an axial length substantially filling an axial space between the pistons and pad means and the shorter piston bushing assemblies positioning the pistons at substantially said distance from the pressure plate disk of the second heat sink.

11. The aircraft brake assembly in accordance with claim 10, wherein the pad means is utilized with both of the first and second heat sinks.

12. The aircraft brake assembly in accordance with claim 10, wherein the pressure plate disk and backing plate disk are interchangeable within the respective brake assembly.

13. A method of converting an aircraft brake assembly designed as original equipment to be convertible from a first heat sink of one of carbon and steel brake assemblies to a second heat sink of another of the carbon and steel brake assemblies, the aircraft brake assembly for connection with a surrounding wheel via rotor disks of the respective heat sink, each heat sink including a pressure plate disk, rotor disks, stator disks, and a backing plate disk, the brake assembly comprising the first heat sink, a torque tube connected with the stator disks of the first heat sink and including a backing plate with pad means for engaging the backing plate disk, a piston housing connected by means for connecting with the torque tube, and a spacer member, the piston housing having a plurality of piston bushing assemblies with pistons located a distance from the pressure plate disk, the first heat sink having an overall axial length substantially filling an axial space between the pistons and pad means, comprising the steps of:

disassembling the piston housing, piston bushing assemblies, torque tube, connecting means, spacer member, and first heat sink, and assembling the second heat sink, torque tube, piston housing with piston bushing assemblies, connecting means, and spacer member, the piston housing having longer piston bushing assemblies, wherein the second heat sink has a shorter axial length than the first heat sink and the longer piston bushing assemblies position the pistons at substantially said distance from the pressure plate disk of the second heat sink.

14. The method in accordance with claim 13, wherein the second heat sink comprises a steel heat sink and includes friction material on one of the rotor disks and stator disks thereof.

15. The method in accordance with claim 13, wherein the pad means is utilized with both of the first and second heat sinks.

16. The method in accordance with claim 13, wherein the pressure plate disk and backing plate disk are interchangeable within the respective brake assembly.

17. An aircraft brake assembly designed as original equipment to be convertible from a first heat sink of one of carbon and steel brake assemblies to a second heat sink of another of the carbon and steel brake assemblies, the aircraft brake assembly for connection with a surrounding wheel via rotor disks of the respective heat sink, each heat sink including a pressure plate disk, rotor disks, stator disks, and a backing plate disk, the brake assembly comprising the first heat sink, a torque tube connected with the stator disks of the first heat sink and including a backing plate with pad means for engaging the backing plate disk, a piston housing connected by means for connecting with the torque tube, and a spacer member, the piston housing having a plurality of piston bushing assemblies with pistons located a distance from the pressure plate disk, the first heat sink having an overall axial length substantially filling an axial space between the pistons and pad means, the brake assembly enabling:

disassembly of the piston housing, piston bushing assemblies, torque tube, connecting means, spacer member, and first heat sink, and assembly of the second heat sink, torque tube, piston housing with piston bushing assemblies, connecting means, and spacer member, the piston housing having longer piston bushing assemblies, wherein the second heat sink has a shorter overall axial length than the first heat sink and the longer piston bushing assemblies position the pistons at substantially said distance from the pressure plate disk of the second heat sink.

18. The aircraft brake assembly in accordance with claim 17, wherein second heat sink comprises a steel heat sink and includes friction material on one of the rotor disks and stator disks thereof.

19. The aircraft brake assembly in accordance with claim 17, wherein the pad means is utilized with both of the first and second heat sinks.

20. The aircraft brake assembly in accordance with claim 17, wherein the pressure plate disk and backing plate disk are interchangeable within the respective brake assembly.

21. A method of converting an aircraft brake assembly designed as original equipment to be convertible from a first heat sink of one of carbon and steel brake assemblies to a second heat sink of another of the carbon and steel brake assemblies, the aircraft brake assembly for connection with a surrounding wheel via rotor disks of the respective heat sink, each heat sink including a pressure plate disk, rotor disks, stator disks, and a backing plate disk, the brake assembly comprising the first heat sink, a torque tube connected with the stator disks of the first heat sink and including a backing plate with pad means for engaging the backing plate disk, a piston housing connected by means for connecting with the torque tube, and a spacer member, the piston housing having a plurality of piston bushing assemblies with pistons located a distance from the pressure plate disk, the first heat sink having an overall axial length substantially filling an axial space between the pistons and pad means, comprising the steps of:

disassembling the piston housing, piston bushing assemblies, torque tube, connecting means, spacer member, and first heat sink, and assembling the second heat sink, torque tube, piston housing with piston bushing assemblies, connecting means, and spacer member, the piston housing having shorter piston bushing assemblies, wherein the second heat sink has a longer axial length than the first heat sink and the shorter piston bushing assemblies position the pistons at substantially said distance from the pressure plate disk of the second heat sink.

22. The method in accordance with claim 21, wherein the second heat sink comprises a carbon heat sink.

23. The method in accordance with claim 21, wherein the pad means is utilized with both of the first and second heat sinks.

24. The method in accordance with claim 21, wherein the pressure plate disk and backing plate disk are interchangeable within the respective brake assembly.

25. An aircraft brake assembly designed as original equipment to be convertible from a first heat sink of one of carbon and steel brake assemblies to a second heat sink of another of the carbon and steel brake assemblies, the aircraft brake assembly for connection with a surrounding wheel via rotor disks of the respective heat sink, each heat sink including a pressure plate disk, rotor disks, stator disks, and a backing plate disk, the brake assembly comprising the first heat sink, a torque tube connected with the stator disks of the first heat sink and including a backing plate with pad means for engaging the backing plate disk, a piston housing connected by means for connecting with the torque tube, and a spacer member, the piston housing having a plurality of piston bushing assemblies with pistons located a distance from the pressure plate disk, the first heat sink having an overall axial length substantially filling an axial space between the pistons and pad means, the brake assembly enabling:

disassembly of the piston housing, piston bushing assemblies, torque tube, connecting means, spacer member, and first heat sink, and assembly of the second heat sink, torque tube, piston housing with piston bushing assemblies, connecting means, and spacer member, the piston housing having shorter piston bushing assemblies, wherein the second heat sink has a longer overall axial length than the first heat sink and the shorter piston bushing assemblies position the pistons at substantially said distance from the pressure plate disk of the second heat sink.

26. The aircraft brake assembly in accordance with claim 25, wherein second heat sink comprises a carbon heat sink.

27. The aircraft brake assembly in accordance with claim 25, wherein the pad means is utilized with both of the first and second heat sinks.

28. The aircraft brake assembly in accordance with claim 25, wherein the pressure plate disk and backing plate disk are interchangeable within the respective brake assembly.

* * * * *